(12) United States Patent
Towns

(10) Patent No.: US 6,561,526 B1
(45) Date of Patent: May 13, 2003

(54) STROLLER WITH ATTACHABLE SEAT ASSEMBLY

(76) Inventor: Benjamin C. Towns, 6 Beach St., Seabright, NJ (US) 07760

( * ) Notice: Subject to any disclaimer, the term of this patent is extended or adjusted under 35 U.S.C. 154(b) by 0 days.

(21) Appl. No.: 10/056,445

(22) Filed: Jan. 25, 2002

(51) Int. Cl.⁷ .................................................. B62B 3/02
(52) U.S. Cl. ........................ 280/30; 280/643; 280/648; 280/47.4; 280/47.38
(58) Field of Search .......................... 280/30, 642, 643, 280/639, 647, 650, 657, 658, 47.25, 47.38, 47.4, 33.993, 648

(56) References Cited

U.S. PATENT DOCUMENTS

| | | | | |
|---|---|---|---|---|
| 1,486,118 A | | 3/1924 | Bain | |
| 2,769,482 A | * | 11/1956 | Carlson | 280/47.35 |
| 2,993,702 A | * | 7/1961 | Gill | 280/41 |
| 3,253,860 A | | 5/1966 | Shapiro | |
| 3,497,234 A | * | 2/1970 | Schray | 280/33.993 |
| 3,612,603 A | * | 10/1971 | Snyder et al. | 297/130 |
| 4,155,588 A | * | 5/1979 | Danziger et al. | 297/115 |
| 4,181,356 A | * | 1/1980 | Fleischer | 297/350 |
| 4,288,124 A | * | 9/1981 | Hamilton | 297/233 |
| 4,381,870 A | * | 5/1983 | Muellner | 280/33.993 |
| 4,596,405 A | * | 6/1986 | Jones | 280/823 |
| 4,632,409 A | * | 12/1986 | Hall et al. | 280/30 |
| 4,711,489 A | * | 12/1987 | Krause | 297/244 |
| 4,813,742 A | | 3/1989 | Cardinael | |
| 4,946,180 A | * | 8/1990 | Baer et al. | 280/39 |
| 5,161,811 A | * | 11/1992 | Cheng | 280/30 |
| 5,201,535 A | | 4/1993 | Kato et al. | |
| 5,213,360 A | * | 5/1993 | Lin | 280/648 |
| D340,140 S | | 10/1993 | Cunningham et al. | |
| 5,374,073 A | * | 12/1994 | Hung-Hsin | 280/655 |
| 5,401,076 A | * | 3/1995 | Dunlap | 297/243 |
| 5,547,205 A | * | 8/1996 | Cabedo | 280/30 |
| 5,848,797 A | | 12/1998 | Paez | |
| 5,988,657 A | * | 11/1999 | Henkel | 280/47.25 |
| 6,135,479 A | * | 10/2000 | Tibay et al. | 280/288.4 |
| 6,276,709 B1 | * | 8/2001 | Chen et al. | 280/650 |

* cited by examiner

Primary Examiner—Frank Vanaman
Assistant Examiner—Bridget Avery

(57) ABSTRACT

A stroller with attachable seat assembly for providing a seat selectively attachable or extendable from a stroller to permit sitting when attending to a baby in the stroller. The stroller with attachable seat assembly includes a seat assembly attachable or extendable from a stroller. The seat assembly includes a frame, a sheet of material for supporting a user, and legs extendable from the frame to support the frame over a support surface. Alternatively, the frame may be easily fully detached and stored in a storage pocket on the stroller or pivotally connected to the stroller to permit retracting and extending of the frame between a storage position and a use position.

6 Claims, 7 Drawing Sheets

STROLLER WITH ATTACHABLE SEAT ASSEMBLY

BACKGROUND OF THE INVENTION

1. Field of the Invention

The present invention relates to infant seating devices and more particularly pertains to a new stroller with attachable seat assembly for providing a seat selectively attachable or extendable from a stroller to permit sitting when attending to a baby in the stroller.

2. Description of the Prior Art

The use of infant seating devices is known in the prior art. U.S. Pat. No. 5,201,535 describes a stroller in which the child holding portion is detachable for use as a seat. Another type of child seating device is U.S. Pat. No. 3,253,860 that discloses a foldable seat for attachment to a support structure like a car seat. U.S. Pat. No. 5,848,797 discloses an infant seat structure attached to a shopping cart. U.S. Pat. No. 1,486,118 discloses a free-standing shoe polishing stand having foldable support legs. U.S. Pat. No. 4,813,742 discloses a free-standing orthopedic footstool structure. U.S. Pat. No. Des. 340,140 shows an ornamental structure for a collapsible infant seat.

While these devices fulfill their respective, particular objectives and requirements, the need remains for a seat capable of attachment to a stroller and usable by a full grown person attending to a child in the stroller.

SUMMARY OF THE INVENTION

The present invention meets the needs presented above by providing a seat assembly that is removably attachable to a stroller or semi-permanently attachable to be extendable from the stroller for use.

Still yet another object of the present invention is to provide a new stroller with attachable seat assembly that provides a flat surface for facilitating changing a diaper of a baby or capable of supporting items associated with changing a diaper such as powder bottles and lotion bottles.

To this end, the present invention generally comprises a seat assembly attachable or extendable from a stroller. The seat assembly includes a frame, a sheet of material for supporting a user, and legs extendable from the frame to support the frame over a support surface. Alternatively, the frame may be easily fully detached and stored in a storage pocket on the stroller or pivotally connected to the stroller to permit retracting and extending of the frame between a storage position and a use position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
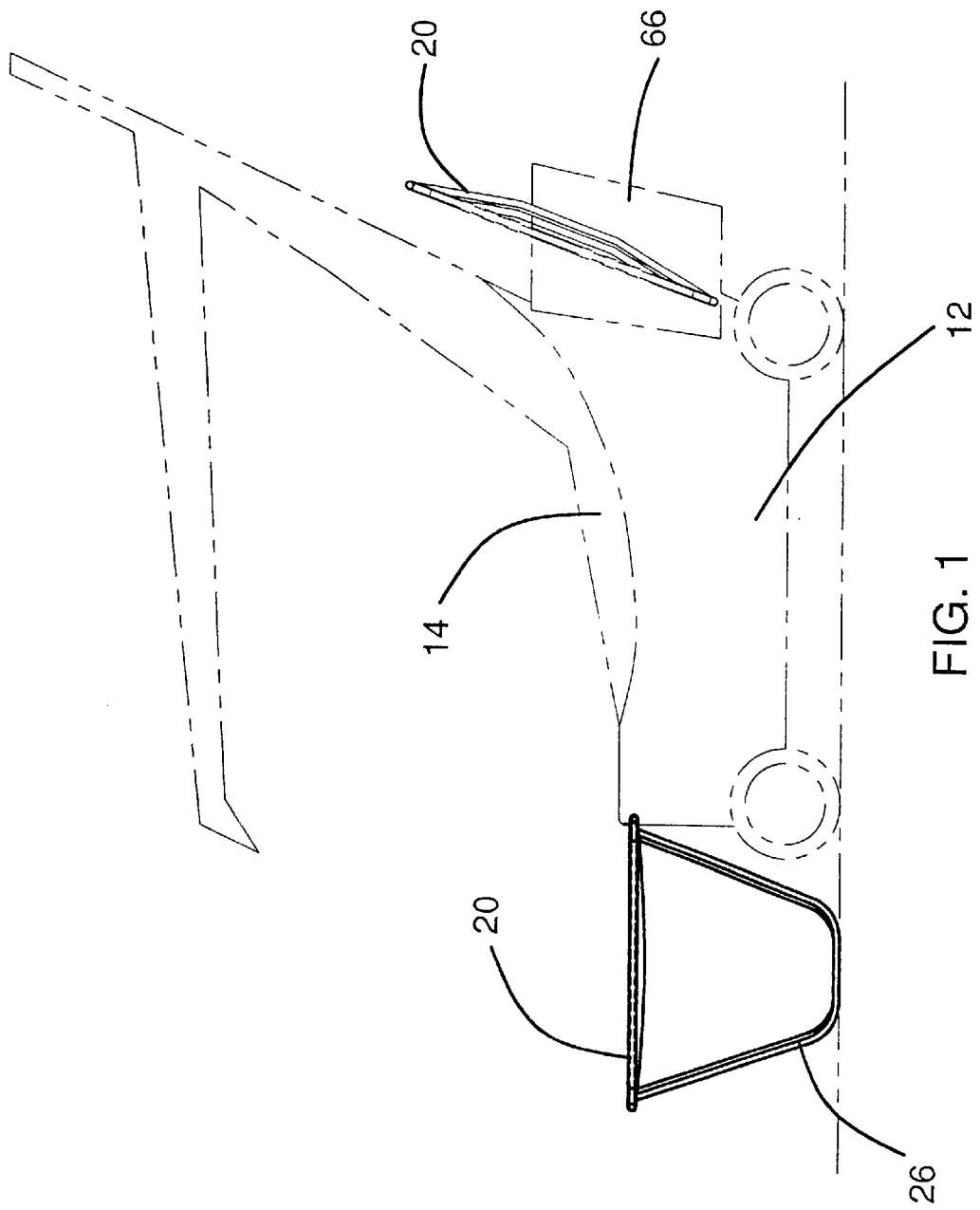
FIG. 1 is a side view of a new stroller with attachable seat assembly according to the present invention.
Figure 2:
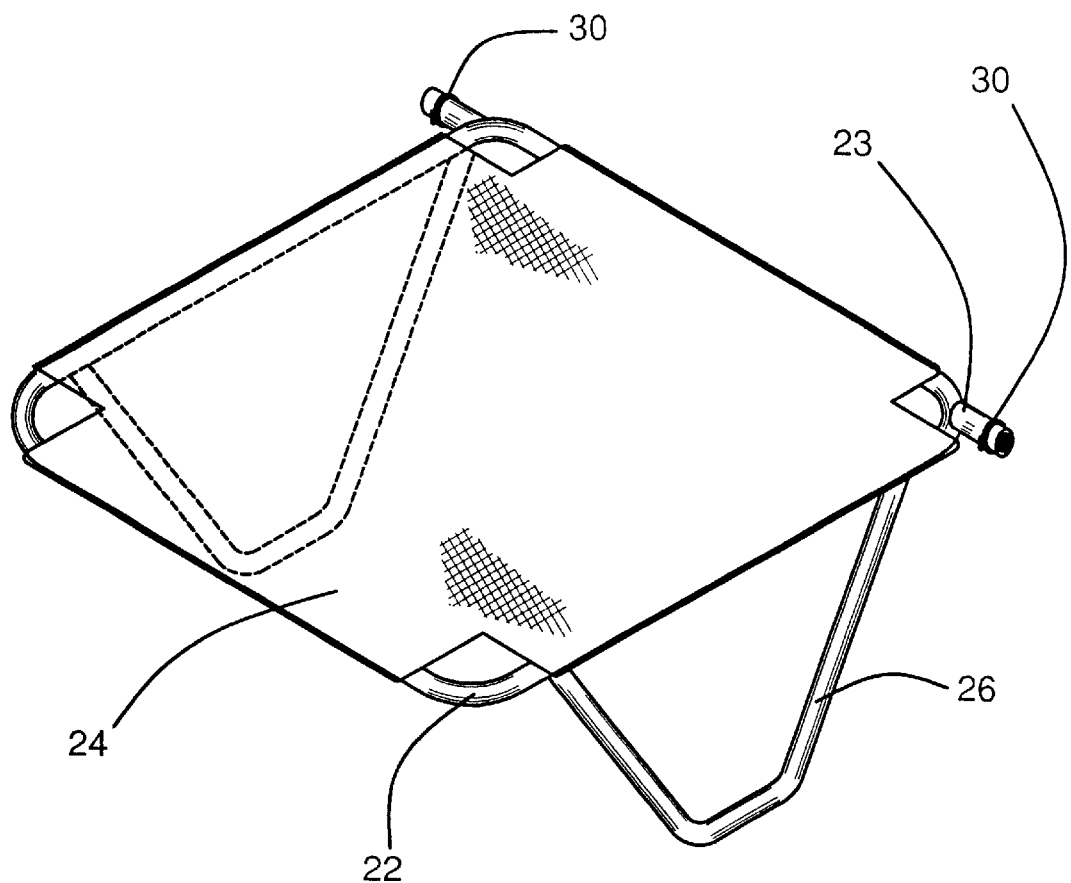
FIG. 2 is a perspective view of the seat assembly of the present invention.
Figure 3:
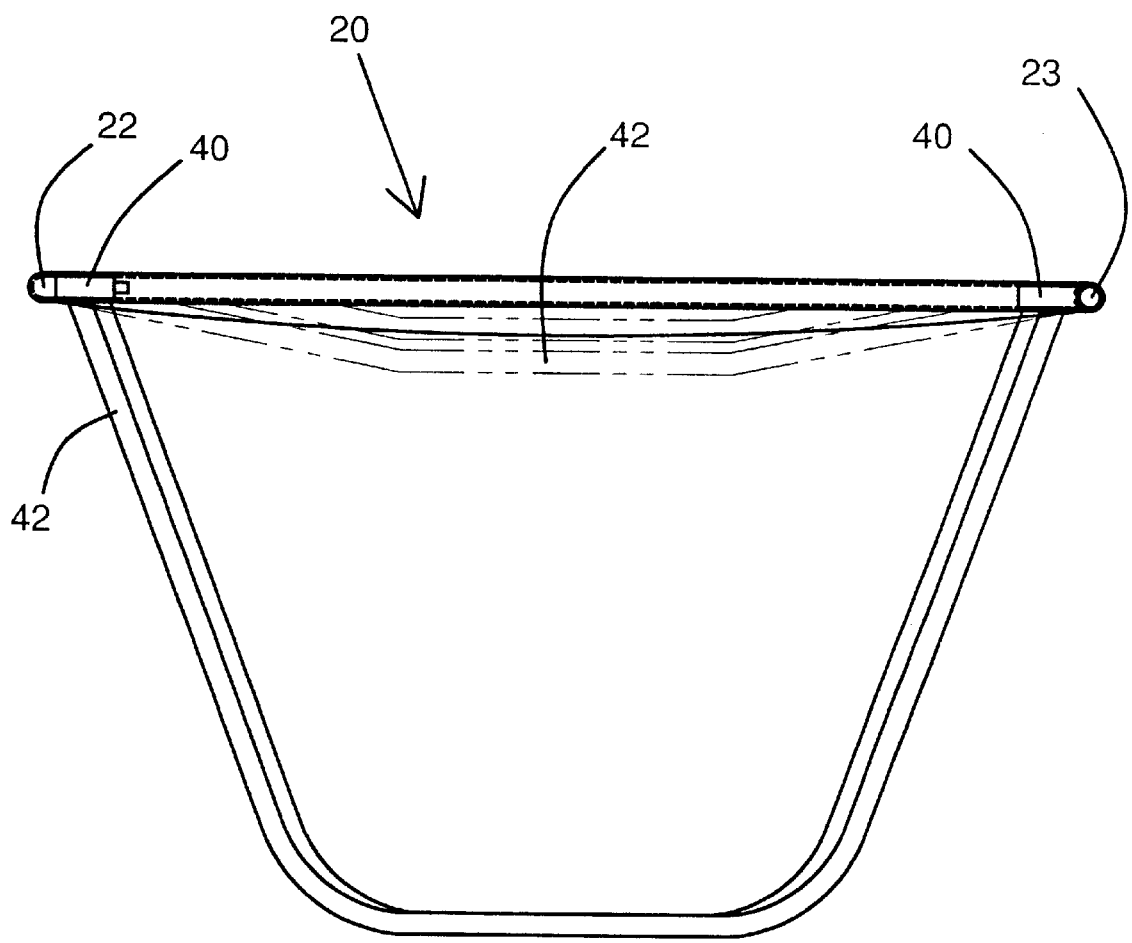
FIG. 3 is a side view of the seat assembly of the present invention.
Figure 4:
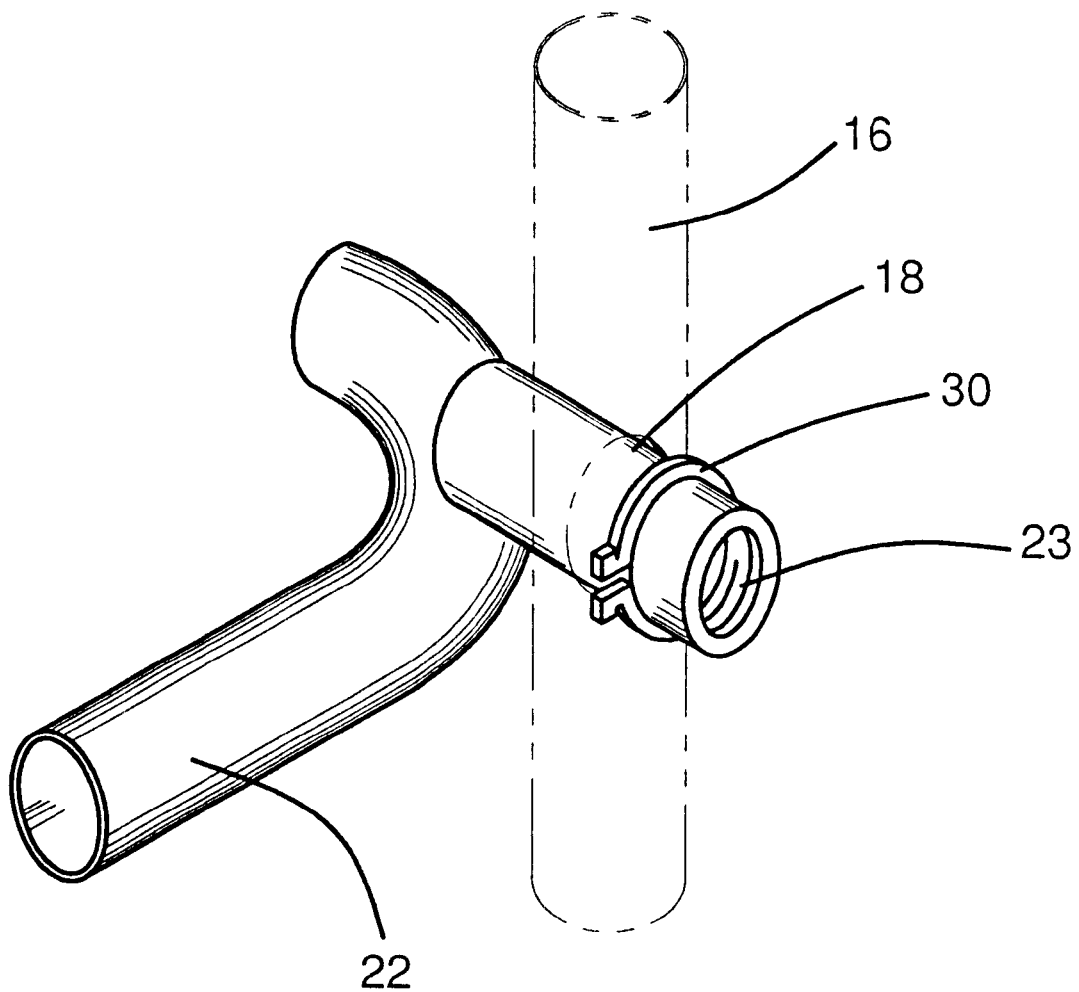
FIG. 4 is an enlarged view of the connection of seat assembly to the stroller of the present invention.
Figure 5:
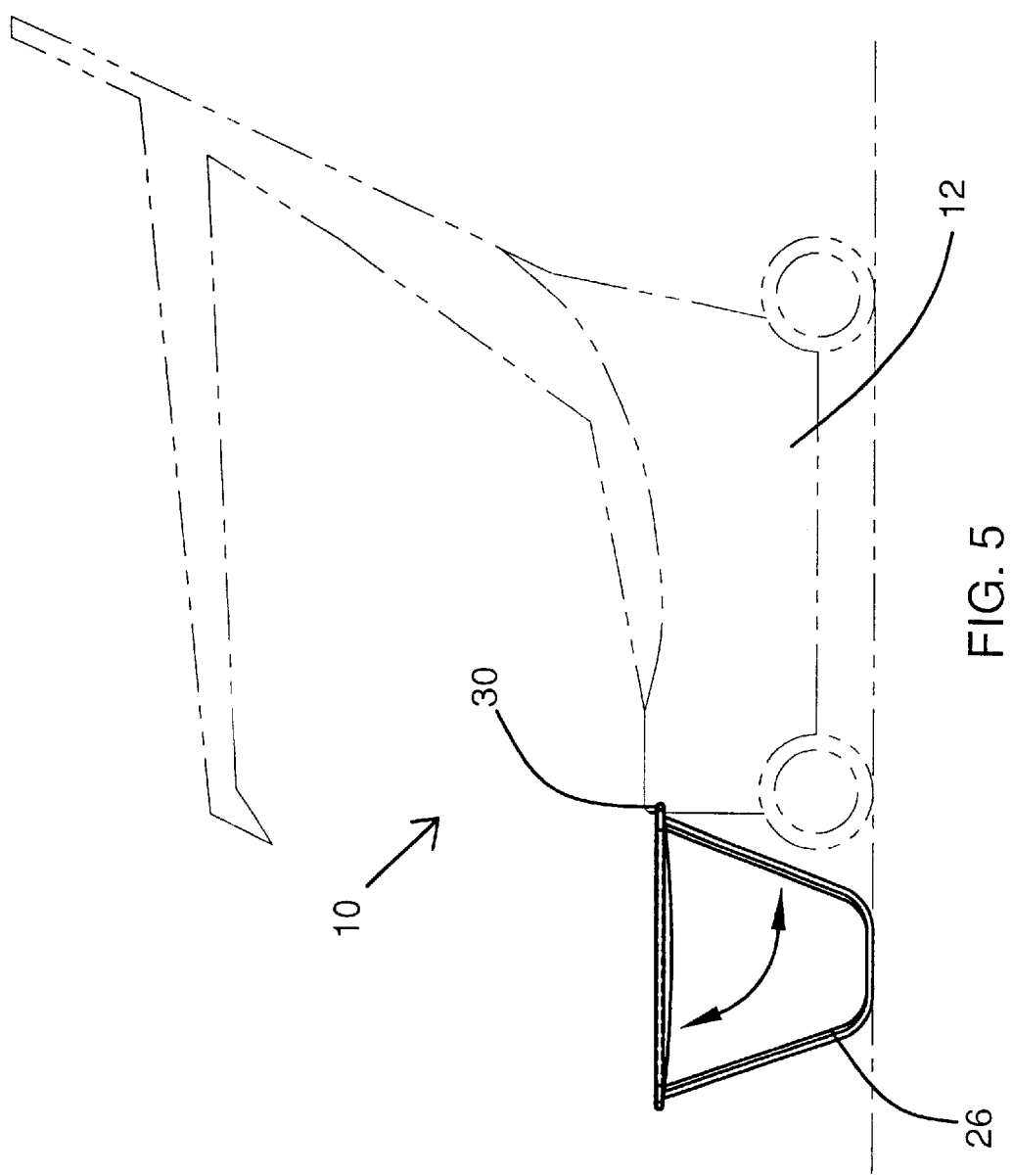
FIG. 5 is a side view of an alternate embodiment of the present invention.
Figure 6:
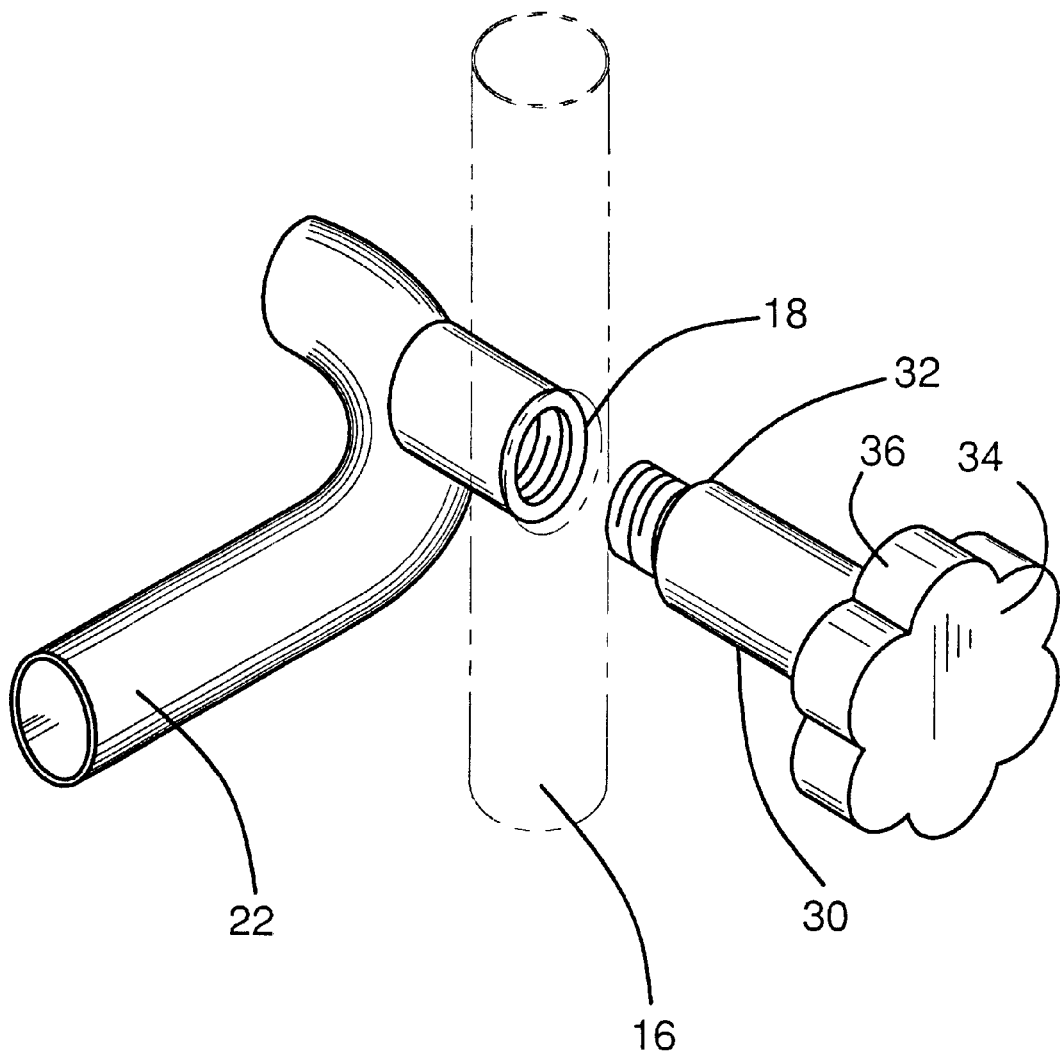
FIG. 6 is an enlarged view of the attachment of the alternate embodiment to the stroller of the present invention.

With reference now to the drawings, and in particular to FIGS. 1 through 7 thereof, a new stroller with attachable seat assembly embodying the principles and concepts of the present invention and generally designated by the reference numeral 10 will be described.

As best illustrated in FIGS. 1 through 7, the stroller with attachable seat assembly 10 generally comprises a stroller 12 that includes a child supporting portion 14 and a stroller frame portion 16. A seat assembly 20 is selectively couplable to the stroller frame portion 16.

The seat assembly 20 includes a seat frame 22, a substantially inelastic sheet of material 24 coupled to the seat frame 22, and leg portions 26 pivotally connected to the seat frame 22 such that the leg portions 26 are foldable between a storage position and a use position.

The stroller frame portion 16 includes a pair of attachment holes 18. The seat frame 22 includes a pair of nubs 23. Each of the nubs 23 is insertable through an associated one of the holes 18 in the stroller frame portion 22. A pair of attachment members 30 are provided. Each of the attachment members 30 is engageable to an associated one of the nubs 23 for preventing the associated nub 23 from passing back through the associated hole 18. Thus, the seat frame 22 is coupled to the stroller 12.

In an embodiment, each of the attachment members 30 includes a bearing surface 32 for abutting the stroller frame portion 14 around the associated hole 18 for frictionally holding the seat assembly 20 in a static position when the attachment members 30 are fully tightened into the nubs 23.

Each of the attachment members 30 includes a head portion 34 with a knurled outer perimeter 36 to facilitate grasping and rotation of the attachment member 30.

Figure 7:
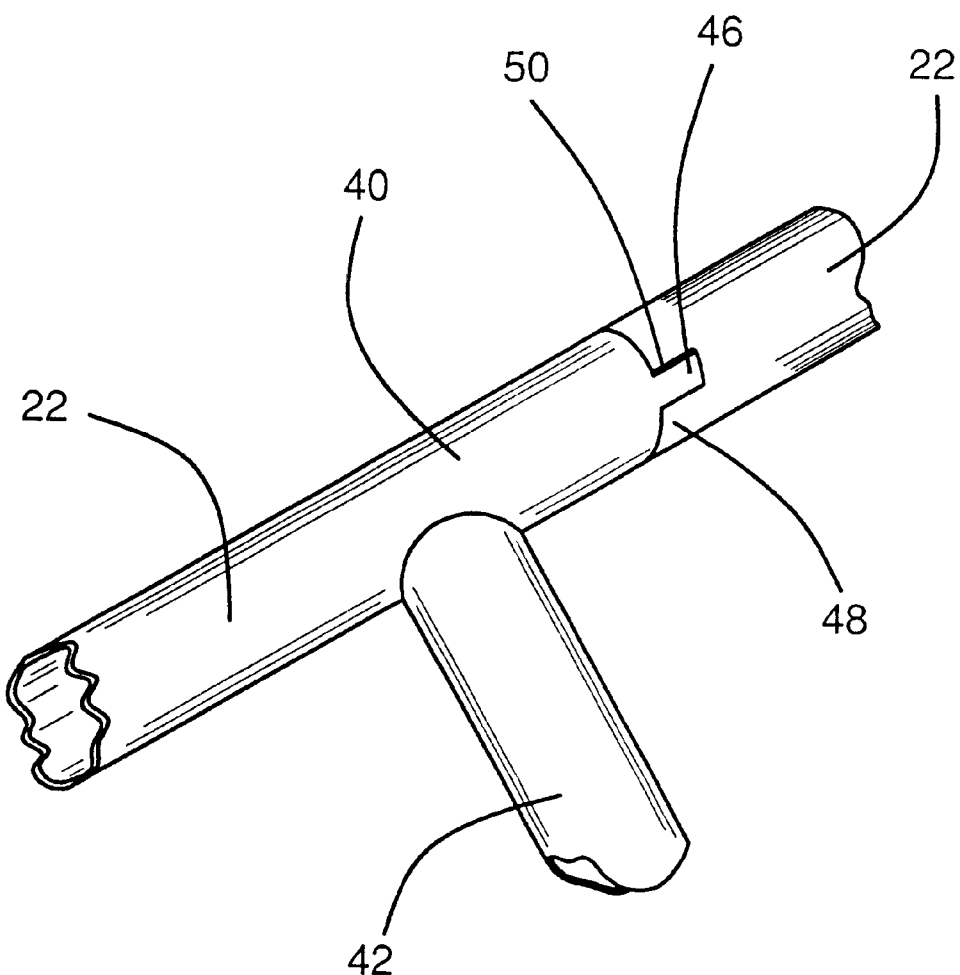
FIG. 7 is an enlarged view of the attachment collar of the legs of the seat assembly of the present invention.

Each of the leg portions 26 includes a pair of attachment collars 40 and a generally U-shaped leg 42 extending from the attachment collars 40. Each attachment collar 40 includes a tab portion 46. The seat frame 22 includes a plurality of recesses 48 as represented in FIG. 7. Each of the recesses 48 receives an associated one of the tab portions 46 such that the tab portion 46 slides in the recess 48 when the leg portion 16 is pivoted. Each recess 48 includes an end wall 50 for abutting the tab portion 46 when the leg portion 16 is in the use position for preventing collapsing of the seat assembly 20 during use.

In an embodiment, a storage pocket 66 is coupled to the stroller 12. The seat assembly 20 is insertable into the storage pocket 66 when detached from the stroller frame portion 16.

In use, the seat assembly is connected to the stroller by inserting the nubs through holes in the stroller frame portion. Attachment members are then connected to the nubs to secure the seat assembly to the stroller frame portion. In an embodiment, the attachment members can be tightened to hold the seat assembly in a static position. The seat assembly can be either fully removed and stored in a storage pocket or loosened and folded into a storage position. When the seat assembly is connected and in a use position, leg portions are folded out to support the seat frame.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An assembly comprising:

a stroller having a child supporting portion and a stroller frame portion;

a second seat assembly selectively couplable to said stroller frame portion for supporting an adult in a seated position adjacent to said stroller;

said second seat assembly including a seat frame, a substantially inelastic sheet of material coupled to said seat frame, and leg portions pivotally connected to said seat frame such that said leg portions are foldable between a storage position and a use position;

said stroller frame portion having a pair of attachment holes;

said seat frame having a pair of nubs, each of said nubs being insertable through an associated one of said holes in said stroller frame portion; and a pair of attachment members, each of said attachment members being engageable to an associated one of said nubs for preventing said associated nub from passing back through said associated hole whereby said seat frame is coupled to said stroller.

2. The assembly of claim 1, further comprising:

each of said attachment members having a bearing surface for abutting said stroller frame portion around said associated hole for frictionally holding said second seat assembly in a static position when said attachment members are fully tightened into said nubs.

3. The assembly of claim 1, further comprising:

each of said leg portions having a pair of attachment collars and a generally U-shaped leg extending from said attachment collars.

4. The assembly of claim 2, further comprising:

each of said attachment members having a head portion with a knurled outer perimeter to facilitate grasping and rotation of said attachment member.

5. An assembly comprising:

a stroller having a child supporting portion and a stroller frame portion;

a second seat assembly selectively couplable to said stroller frame portion for supporting an adult in a seated position adjacent to said stroller;

said second seat assembly including a seat frame, a substantially inelastic sheet of material coupled to said seat frame, and leg portions pivotally connected to said seat frame such that said leg portions are foldable between a storage position and a use position;

a storage pocket coupled to said stroller, said second seat assembly being insertable into said storage pocket when detached from said stroller frame portion.

6. An assembly comprising:

a stroller having a child supporting portion and a stroller frame portion;

a second seat assembly selectively couplable to said stroller frame portion for supporting an adult in a seated position adjacent to said stroller;

said second seat assembly including a seat frame, a substantially inelastic sheet of material coupled to said seat frame, and leg portions pivotally connected to said seat frame such that said leg portions are foldable between a storage position and a use position;

each of said leg portions having a pair of attachment collars and a generally U-shaped leg extending from said attachment collars;

each attachment collar having a tab portion;

said stroller frame portion having a plurality of recesses, each of said recesses receiving an associated one of said tab portions such that said tab portion slides in said recess when said leg portion is pivoted; and each recess having an end wall for abutting said tab portion when said leg portion is in said use position for preventing collapsing of said seat assembly during use.

* * * * *